United States Patent
Hida (10) Patent No.: US 10,047,901 B2
(45) Date of Patent: Aug. 14, 2018

(54) JOINT FIXATION MECHANISM FOR LEG SUPPORT MEMBER

(71) Applicant: HEIWA SEIKI KOGYO CO., LTD., Saitama (JP)

(72) Inventor: Nobuyuki Hida, Saitama (JP)

(73) Assignee: HEIWA SEIKI KOGYO CO., LTD., Saitama (JP)

( * ) Notice: Subject to any disclaimer, the term of this patent is extended or adjusted under 35 U.S.C. 154(b) by 0 days.

(21) Appl. No.: 15/416,298

(22) Filed: Jan. 26, 2017

(65) Prior Publication Data
US 2017/0370518 A1    Dec. 28, 2017

(30) Foreign Application Priority Data
Jun. 28, 2016  (JP) .................................. 2016-127702

(51) Int. Cl.
*F16M 11/26* (2006.01)
*F16M 11/36* (2006.01)

(52) U.S. Cl.
CPC ....... *F16M 11/36* (2013.01); *F16M 2200/021* (2013.01)

(58) Field of Classification Search
USPC ...................................................... 248/188.5
See application file for complete search history.

(56) References Cited

U.S. PATENT DOCUMENTS

| | | | | |
|---|---|---|---|---|
| 6,487,807 B1 * | 12/2002 | Kopman | ................. | F41A 23/12 42/72 |
| 7,364,125 B2 * | 4/2008 | Speggiorin | ............ | F16M 11/14 248/181.1 |
| 7,584,568 B1 * | 9/2009 | Brownlee | ............... | F41A 23/12 42/94 |
| 9,380,904 B2 * | 7/2016 | Peek | .................... | A47G 33/008 |
| 2008/0061195 A1 * | 3/2008 | Carnevali | .............. | F16M 11/14 248/125.8 |
| 2009/0084912 A1 * | 4/2009 | Speggiorin | ............ | F16M 11/16 248/176.3 |
| 2015/0122968 A1 * | 5/2015 | Hu | ......................... | F16M 11/16 248/558 |

FOREIGN PATENT DOCUMENTS

| | | |
|---|---|---|
| JP | D1146910 | 7/2002 |
| WO | 2007/039000 | 4/2007 |

* cited by examiner

*Primary Examiner* — Monica E Millner
(74) *Attorney, Agent, or Firm* — Wenderoth, Lind & Ponack, L.L.P.

(57) ABSTRACT

A joint portion for angle adjustment arranged between a leg base portion and a leg support member of an imaging equipment-grade tripod includes a joint fixation member with a joint, a pole member having an upper end connected by the joint of the joint fixation member a lower end connected to the leg base portion, a sleeve provided below the joint fixation member and fitting to the joint fixation member, and a coil spring wound around a central axis of the pole member and pressing the sleeve upward. With the joint portion being fixed by fitting between the joint fixation member and the sleeve, the sleeve is pressed downward to release the fitting between the joint fixation member and the sleeve, so that the joint portion is released.

6 Claims, 6 Drawing Sheets

JOINT FIXATION MECHANISM FOR LEG SUPPORT MEMBER

BACKGROUND OF THE INVENTION

1. Technical Field

The present invention relates to a joint fixation mechanism for a leg support member, and more particularly to a joint fixation mechanism for a leg support member including a joint portion for angle adjustment arranged between a leg base portion and a leg support member of an imaging equipment-grade tripod.

2. Description of the Related Art

Conventionally, when imaging is carried out with an imaging equipment such as a camera and a video camera, a tripod is used as a support for stable support of the imaging equipment. Such a tripod for imaging includes three legs, and each of the three legs has one end which is connected to the leg base portion. The three legs are properly spread out in use during imaging.

Furthermore, in recent years, a simple type tripod with relatively short legs and a long leg support member between a leg base portion and an imaging equipment mounting portion, e.g., a camera platform, has been used. Such a tripod with short legs is superior in that it is easy to carry and does not require a large footprint during imaging.

Furthermore, there has been proposed the above-described simple tripod with short legs that includes a joint portion on a base portion of a long leg support member (see, for example, JP 2009-510857 A). The proposed tripod includes a ball joint in the joint portion and is provided with a shock-absorbing member with a viscous coupling above of the joint portion, enabling a reduction in oscillation generated by motion of the joint portion.

CITATION LIST

Patent Literature

Patent Literature 1: JP 2009-510857 A

SUMMARY OF THE INVENTION

1. Technical Problem

The joint portion provided on the tripod described in JP 2009-510857 A is capable of reducing oscillations due to angle adjustment or the like. However, there is a problem that the joint portion has a constantly moving structure, which rather brings an imaging equipment into an unstable state. Furthermore, there is also a risk that, when a heavy imaging equipment is supported in such an unstable state, for example, the tripod falls over and causes damage to the imaging equipment.

The present invention has been made in view of the above-described conventional problems, and it is an object of the present invention to provide a joint fixation mechanism for a leg support member, which joint fixation mechanism enables fixation and release of a joint portion of the leg support member of an imaging equipment-grade tripod with a single action such that, when the joint portion is fixed, the imaging equipment can be supported in a stable state and when the joint portion is released, the angle can be freely adjusted.

2. Solution to the Problem

Specifically, the joint fixation mechanism for a leg support member according to the present invention is characterized by the features described below.

Firstly, a joint fixation mechanism for a leg support member of the present invention includes a joint portion for angle adjustment arranged between a leg base portion and the leg support member of an imaging equipment-grade tripod, the joint portion including: a joint fixation member including a tapered portion on an lower inner side, the joint fixation member including a joint above the tapered portion; a pole member having a lower end connected to the leg base portion and an upper end connected by the joint of the joint fixation member; a sleeve provided below the joint fixation member, the sleeve having a space therein, the sleeve having an insertion hole at an uppercentral part through which the pole member is inserted, the sleeve having a fitting tapered portion around the insertion hole for fitting to the tapered portion of the joint fixation member, the sleeve being formed with an operation portion protruding outward from a side surface; and a coil spring for pressing the sleeve upward, the coil spring being wound around a central axis of the pole member in the space of the sleeve, wherein with the joint portion being fixed by fitting between the tapered portion of the joint fixation member and the fitting tapered portion of the sleeve, the joint portion is released as the sleeve is pressed downward so that the fitting between the tapered portion of the joint fixation member and the fitting tapered portion of the sleeve is released.

Secondly, preferably, the joint fixation mechanism for a leg support member of the above-described first invention includes: a rotary cam member accommodated in the space of the sleeve, the rotary cam member having a bottomed columnar shape, the rotary cam member having an insertion hole at a central part of the bottom portion through which the pole member is inserted, the rotary cam member having a coil spring lower end receiving portion around the insertion hole for receiving a lower end of the coil spring, the rotary cam member having a fitting portion protruding outward and extending axially on an upper side surface; a stationary cam member having a columnar shape, the stationary cam member being accommodated in the space of the sleeve, the stationary cam member being fixed to the pole member and the leg base portion, the stationary cam member allowing the rotary cam member to be rotatably inserted, the stationary cam member having a protrusion portion protruding outward on an upper part of a peripheral portion, the stationary cam member having a peak portion for assisting rotation of the rotary cam member on an upper end of the peripheral portion; and a slide cam member having a columnar shape, the slide cam member being accommodated in the space of the sleeve, the slide cam member being fixed to the sleeve, the slide cam member having a plurality of recessed portions on a side surface, the recessed portions being supported to be slidable in an upward and downward direction by the fitting portion of the rotary cam member and the protrusion portion of the stationary cam member, the slide cam member having a tab portion for suppressing rotation of the rotary cam member on an upper peripheral portion between the recessed portion and an adjacent recessed portion, wherein with the joint portion being fixed by fitting between the tapered portion of the joint fixation member and the fitting tapered portion of the sleeve, when the sleeve is pressed downward, the fitting portion of the rotary cam member is disengaged from the recessed portion of the slide cam member, and the fitting portion is rotated along a slope of the peak portion of the stationary cam member, and then when the sleeve is released, the fitting portion is caught by the tab portion of the slide cam member and is fixed with the sleeve being in a lowered state, and the fitting between the tapered portion of the joint fixation member and the fitting tapered portion of the sleeve is released, so that the joint portion is released, and when the sleeve is again pressed downward, the fitting portion of the rotary cam member is disengaged from the tab portion of the slide cam member, and the fitting portion is rotated along the slope of the peak portion of the stationary cam member, and then when the sleeve is released, the recessed portion is supported by the protrusion portion and the fitting portion, the slide cam member is moved upward and the sleeve is moved upward, the tapered portion of the joint fixation member is fitted to the fitting tapered portion of the sleeve, so that the joint portion is fixed.

Thirdly, in the joint fixation mechanism for a leg support member of the above-described first or second invention, with the joint portion in a released state, the joint fixation member is preferably swingable within a range of a tapered angle of the tapered portion formed on the joint fixation member.

Fourthly, preferably, in the joint fixation mechanism for a leg support member of the above-described first to third inventions, the tapered portion formed on the joint fixation member includes a joint locking tapered portion and an inclination angle restricting tapered portion, with the joint portion in a fixed state, the joint locking tapered portion is fitted and fixed to the fitting tapered portion of the sleeve, and with the joint portion in a released state, the joint fixation member is swingable within a range of a tapered angle of the inclination angle restricting tapered portion.

Fifthly, in the joint fixation mechanism for a leg support member of the above-described first to fourth inventions, the joint for connecting the joint fixation member to the pole member is preferably a universal joint connected by two perpendicularly intersecting pins or a ball joint including a socket portion formed on the joint fixation member and a spherical portion formed at an upper end of the pole member.

Sixthly, in the joint fixation mechanism for a leg support member of the above-described first to fifth inventions, an extendable mechanism for adjusting a length of the leg support member is preferably provided at an intermediate part of the leg support member.

3. Advantageous Effects of the Invention

According to the present invention, a joint fixation mechanism for a leg support member, which joint fixation mechanism enables fixation and release of a joint portion of the leg support member of an imaging equipment-grade tripod with a single action such that, when the joint portion is fixed, the imaging equipment can be supported in a stable state and when the joint portion is released, the angle can be freely adjusted, can be provided.

BRIEF DESCRIPTION OF THE DRAWINGS

FIGS. 3A and 3B are schematic cross-sectional views of a joint fixation mechanism for a leg support member of the present invention, FIG. 3A illustrates the joint portion in a fixed state, and FIG. 3B illustrates the joint portion in a released state;

FIGS. 6A to 6C are schematic partial cross-sectional views of a joint fixation mechanism for a leg support member according to another embodiment of the present invention, FIG. 6A illustrates the joint portion in a fixed state, FIG. 6B illustrates the joint portion in a released state, and FIG. 6C illustrates the joint portion in a released swingable state;

DETAILED DESCRIPTION OF THE EMBODIMENTS

Figure 1:
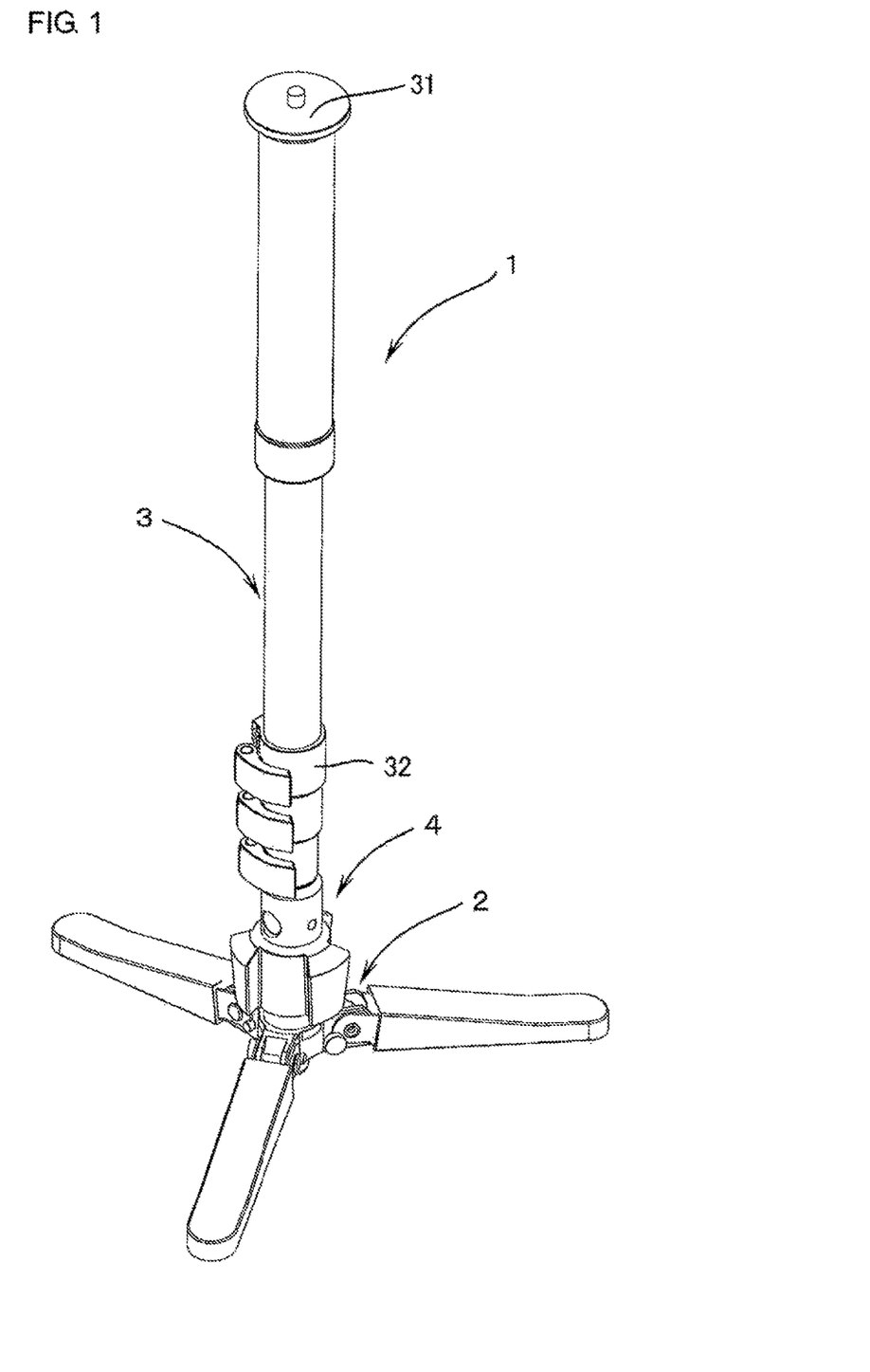
FIG. 1 is a perspective view of an imaging equipment-grade tripod including a joint fixation mechanism for a leg support member of the present invention.
Figure 2:
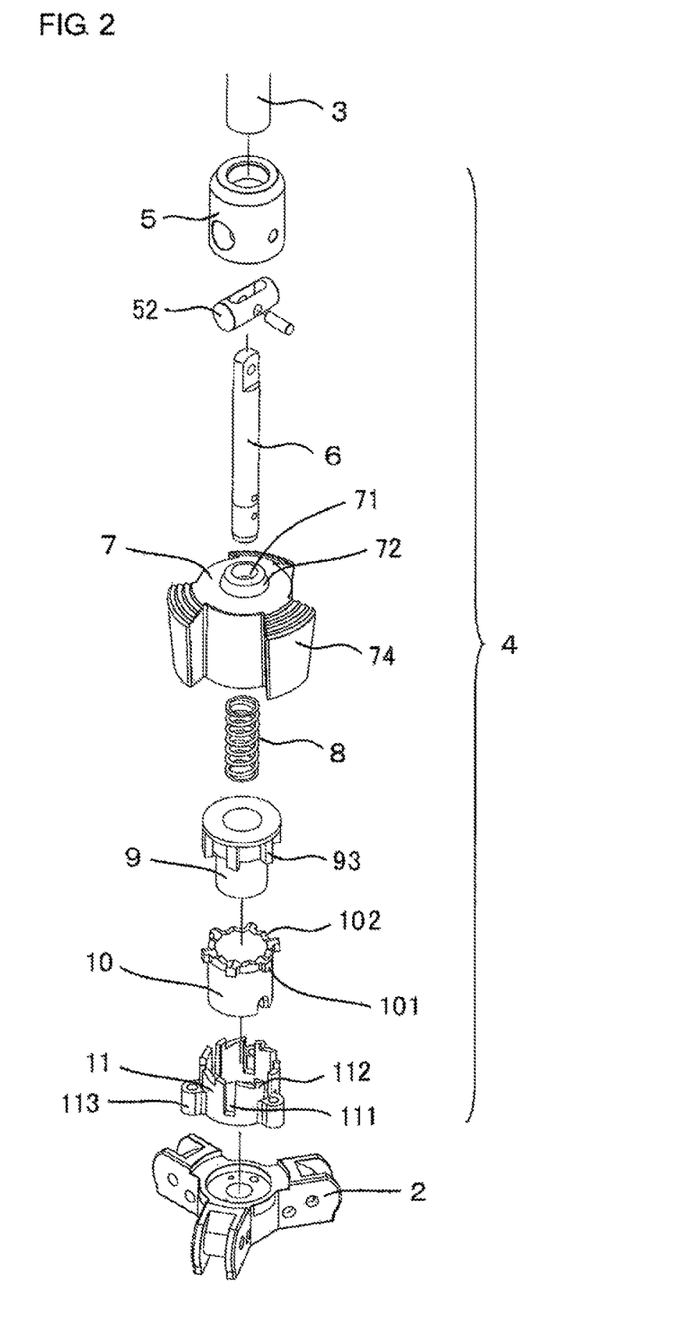
FIG. 2 is an exploded perspective view illustrating a structure of a joint fixation mechanism for a leg support member of the present invention.
Figure 3A:
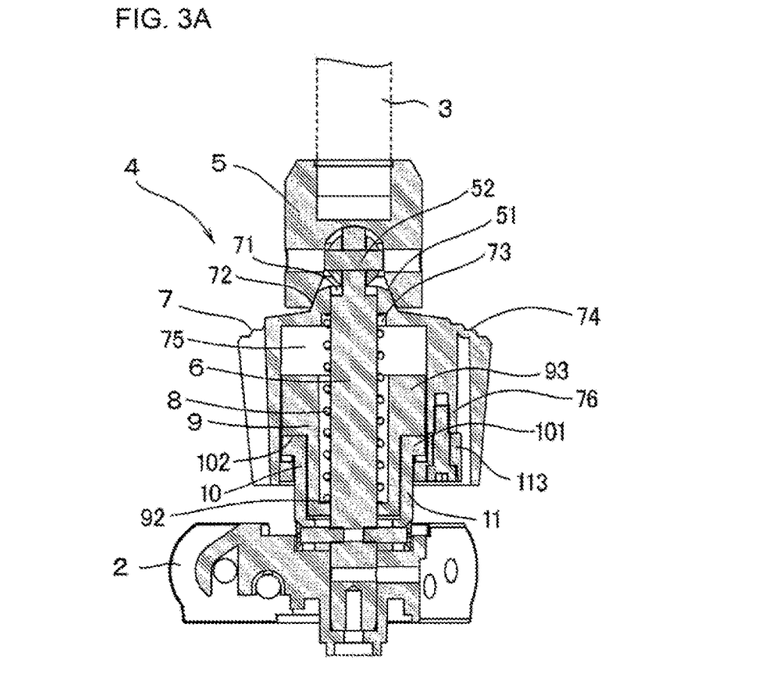
Figure 3B:
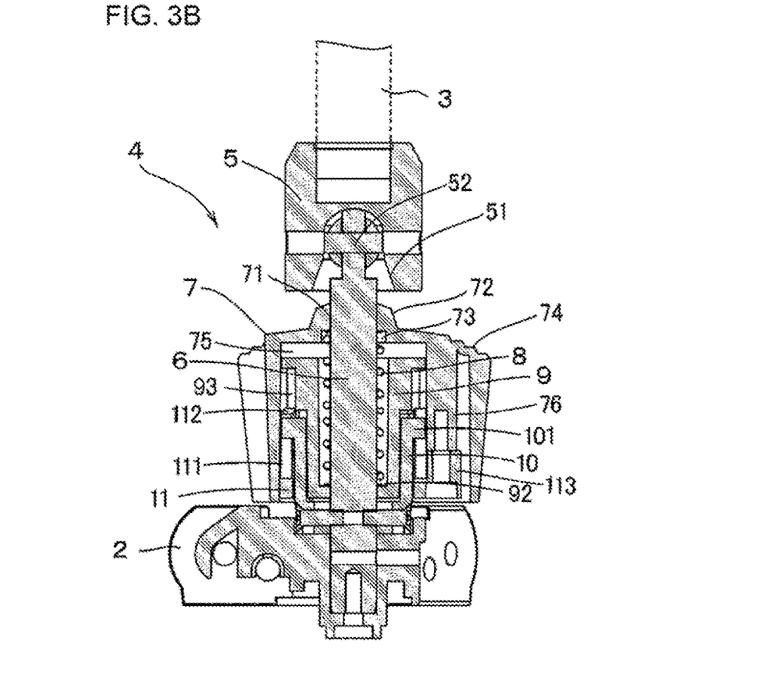

In the following, an embodiment of a joint fixation mechanism for a leg support member of the present invention will be described on the basis of the drawings. FIG. 1 is a perspective view of an imaging equipment-grade tripod including a joint fixation mechanism for a leg support member of the present invention. FIG. 2 is an exploded perspective view illustrating a structure of a joint fixation mechanism for a leg support member. FIGS. 3A and 3B are schematic cross-sectional views of a joint fixation mechanism for a leg support member, FIG. 3A illustrates the joint portion in a fixed state, and FIG. 3B illustrates the joint portion in a released state.

As illustrated in FIG. 1, the joint fixation mechanism for a leg support member of the present embodiment includes a joint portion 4 for angle adjustment arranged between a leg base portion 2 and a leg support member 3 with respect to an imaging equipment-grade tripod 1 including the leg base portion 2, the leg support member 3, and an imaging equipment mounting portion 31. As illustrated in FIGS. 2, 3A and 3B, the joint portion 4 includes a joint fixation member 5, a pole member 6, a sleeve 7, and a coil spring 8. Inside the sleeve 7, a rotary cam member 9, a stationary cam member 10, and a slide cam member 11 for controlling fixation and release of the joint portion 4 are accommodated.

(Joint Fixation Member)

The joint fixation member 5 is a member for bringing the leg support member 3, which is connected to an upper part, into a fixed state or a swingable state by fixing or releasing the joint portion 4 according to a fitting state with respect to the sleeve 7, which is arranged below. The joint fixation member 5 has an upper part connected to the leg support member 3 and a lower part, the inside of which has a tapered portion 51. Furthermore, above the tapered portion 51, a joint 52 for swingably connecting the joint fixation member 5 to the pole member 6 is provided.

Figure 4:
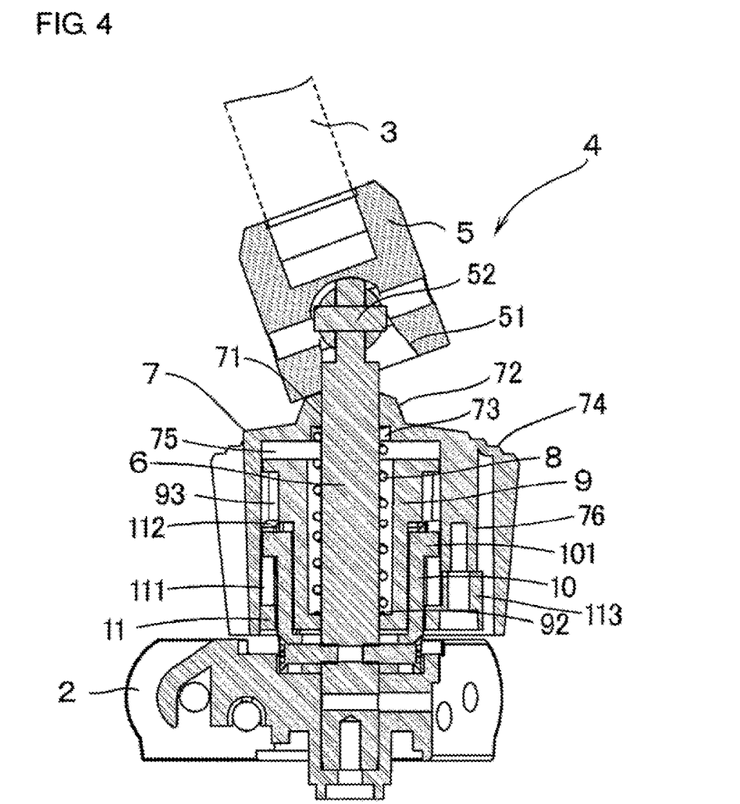
FIG. 4 is a schematic cross-sectional view of a joint fixation mechanism in a released swingable state.
Figure 6A:
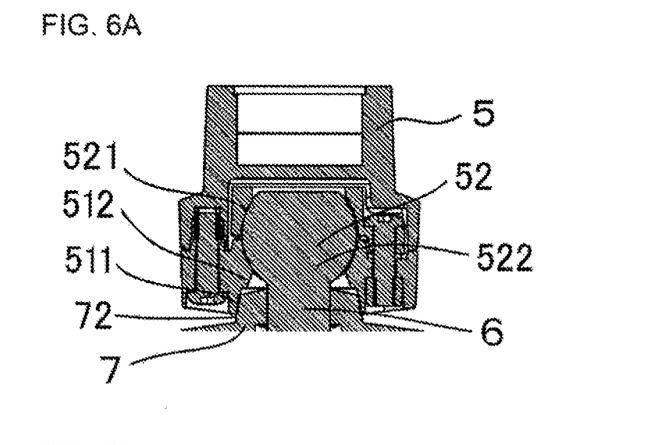
Figure 6B:
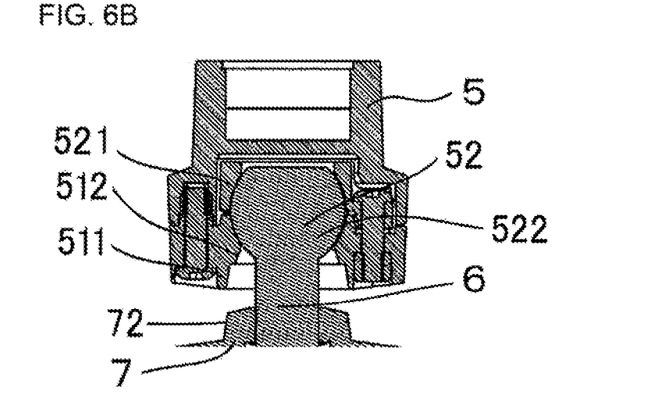
Figure 6C:
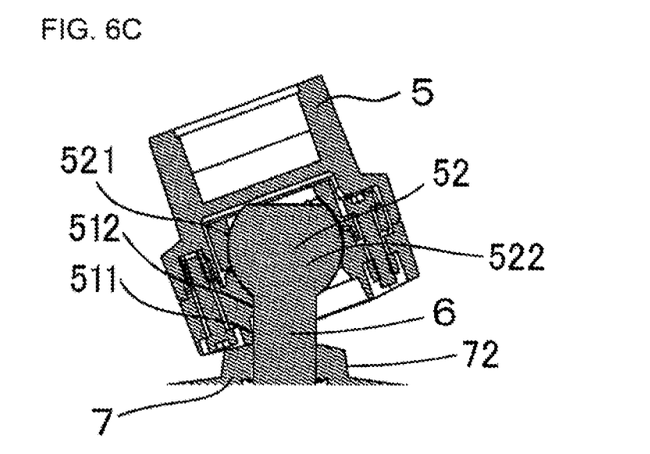

The joint 52 is not particularly limited insofar as the joint fixation member 5 is connected to the pole member 6 in a swingable state. For example, as illustrated in the embodiment of FIGS. 2 to 4, a universal joint connected by two perpendicularly intersecting pins may be used. As illustrated in FIGS. 6A to 6C, a ball joint or the like may be used in which a socket portion 521 is provided within the joint fixation member 5 and a ball stud, which is a spherical portion 522, is formed at an upper end of the pole member 6 so that the spherical portion 522 and the socket portion 521 are swingably connected in spherical contact.

Generally, as illustrated in FIGS. 3A, 3B and 4, the tapered portion 51 has a given tapered angle. The tapered portion 51 contacts a side surface of the pole member 6, thereby allowing the joint fixation member 5, the leg support member 3 connected thereto, and the imaging equipment mounting portion 31 to swing at a given angle.

The tapered angle of the tapered portion 51 may be properly set in consideration of the swing angle of the joint fixation member 5. However, generally, about 20 degrees relative to the central axis of the pole member 6 in vertical position is taken into consideration.

Figure 5:
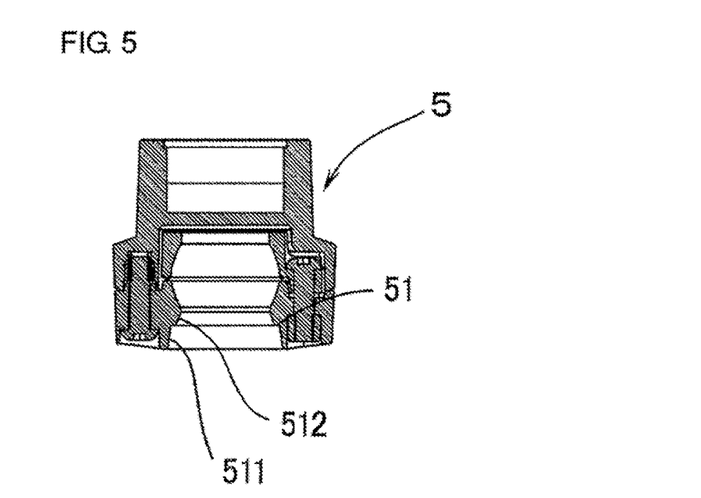
FIG. 5 is a cross-sectional view of a joint fixation member including a joint locking tapered portion and an inclination angle restricting tapered portion.

Furthermore, as illustrated in FIG. 5, the tapered portion 51 of the present embodiment may include a joint locking tapered portion 511 and an inclination angle restricting tapered portion 512.

Specifically, as illustrated in FIGS. 6A to 6C, below the joint 52, the inclination angle restricting tapered portion 512 is provided and the joint locking tapered portion 511 is provided therebelow. Thus, with the joint portion in a fixed state illustrated in FIG. 6A, the joint locking tapered portion 511 can be fitted to a fitting tapered portion 72 of the sleeve 7 to effect fixation. With the joint portion in a released state illustrated in FIG. 6B, the joint fixation member 5 is swingable within the range of the tapered angle of the inclination angle restricting tapered portion 512 as illustrated in FIG. 6C.

Thus, when the joint locking tapered portion 511 and the inclination angle restricting tapered portion 512 are provided, it is not necessary to adapt the tapered angle of the fitting tapered portion 72 of the sleeve 7 to the angle of swing, i.e., the tapered angle of the inclination angle restricting tapered portion 512, enabling an increase in degree of freedom of design.

(Pole Member)

The pole member 6 is a member, which is a shaft for connecting the joint fixation member 5 to the leg base portion 2. The pole member 6 has a long columnar shape. The pole member 6 retains the sleeve 7. The pole member 6 has a lower end, which is perpendicularly fixed to the leg base portion 2, and an upper end, which is connected to the joint fixation member 5 via the joint 52.

(Sleeve)

The sleeve 7 is a member arranged below the joint fixation member 5. The sleeve 7 is allowed to move upward and downward in a vertical direction with respect to the pole member 6, which is a shaft, and controls the fixation and the swing motion of the joint fixation member 5. The sleeve 7 is formed with a space 75 therein and includes an operation portion 74 protruding at an outer circumference. Furthermore, the sleeve 7 has an insertion hole 71 at an uppercentral part, through which the pole member 6 is inserted. The sleeve 7 includes the fitting tapered portion 72, which fits to the tapered portion 51 or the joint locking tapered portion 511 provided at a lower part of the joint fixation member 5.

The tapered angle of the fitting tapered portion 72 is determined by the tapered angle of the tapered portion 51 or the joint locking tapered portion 511 of the joint fixation member 5. The tapered angle of the fitting tapered portion 72 is desirably set to an angle at which the fitting tapered portion 72 is in surface contact with the tapered portion 51 or the joint locking tapered portion 511 in a fitting state.

Furthermore, the circumference of the insertion hole 71 near the space 75 is formed with a spring upper end receiving portion 73 for receiving the coil spring 8, which is wound around the central axis of the pole member 6.

(Coil Spring)

The coil spring 8 is a compression spring, which is wound around the central axis of the pole member 6 and is accommodated in the space 75 of the sleeve 7. The upper end of the coil spring 8 is received by the spring upper end receiving portion 73 in the space 75 of the sleeve 7 and presses the sleeve 7 upward.

Specifically, in general, the fitting tapered portion 72 of the sleeve 7 is fitted to the tapered portion 51 or the joint locking tapered portion 511 of the joint fixation member 5 by being pressed from below by the coil spring 8 in the sleeve 7, rendering the joint portion 4 in a fixed state. With such a configuration, the strength of the upward and downward movement of the sleeve 7 is determined by the characteristics of the coil spring 8. Therefore, it is necessary to select the coil spring 8 in consideration of the length, the strength, and the like.

Furthermore, the joint fixation mechanism for a leg support member of the present embodiment enables fixation control for the upward and downward movement of the sleeve 7 by means of the rotary cam member 9, the stationary cam member 10 and the slide cam member 11, which are accommodated in the space 75 of the sleeve 7.

(Rotary Cam Member)

The rotary cam member 9 is a member for controlling the retention state of the sleeve 7 in upper and lower movement positions in such a manner that the rotary cam member 9 changes the fitting state with respect to the slide cam member 11 by being rotated by the upward and downward movement operation of the sleeve 7. The rotary cam member 9 has a columnar bottomed cup-like shape. The rotary cam member 9 has an insertion hole 91 at a central part of the bottom portion through which the pole member 6 is inserted. The circumference above the insertion hole 91 in formed with a spring lower end receiving portion 92 for preventing insertion of the lower end of the coil spring 8, which is wound around the central axis of the pole member 6. On an upper side surface, the rotary cam member 9 includes fitting portions 93, which are outwardly protruded and extended axially. The fitting portions 93 are supported on recessed portions 111 of the slide cam member 11 to be described below to effect sliding in an upward and downward direction, and are disengaged from the recessed portions 111 and fit to tab portions 112.

(Stationary Cam Member)

The stationary cam member 10 is a cylindrical member, into which the rotary cam member 9 is rotatably inserted and which assists the rotation operation of the rotary cam member 9. The stationary cam member 10 has a lower part, which is fixed to the pole member 6 and the leg base portion 2. Furthermore, the stationary cam member 10 includes protrusion portions 101 protruding outward on an upper part of the peripheral portion. The protrusion portions 101 support the slide cam member 11 at the recessed portions 111 of the slide cam member 11 so that the slide cam member 11 is slidable in an upward and downward direction. Furthermore, the stationary cam member 10 includes peak portions 102 for assisting the rotation of the rotary cam member 9 on an upper end of the peripheral portion.

(Slide Cam Member)

The slide cam member 11 is a member, which is accommodated in the space 75 of the sleeve 7, fixed to the sleeve 7, and is identically moved upward and downward by the upward and downward movement of the sleeve 7.

The slide cam member 11 is tightly fixed to the sleeve 7 as mounting portions 113 are screwed on portions 76 for mounting. The mounting portions 113 have a screw hole and are protruded outward from a lower side surface of the slide cam member 11. The portions 76 for mounting are formed at a lower part of the operation portion 74 of the sleeve 7.

Furthermore, the slide cam member 11 includes the recessed portions 111, which are extended axially, on a side surface. The recessed portions 111 are supported to be slidable in an upward and downward direction by the fitting portions 93 of the rotary cam member 9 and the protrusion portions 101 of the stationary cam member 10. Furthermore, the slide cam member 11 includes the tab portions 112 on an upper peripheral portion between the recessed portion 111 and the adjacent recessed portion 111. The fitting portions 93 of the rotary cam member 9 are fitted to the tab portions 112 and suppress the rotation.

(Fixation and Release of the Joint Portion)

Figure 7:
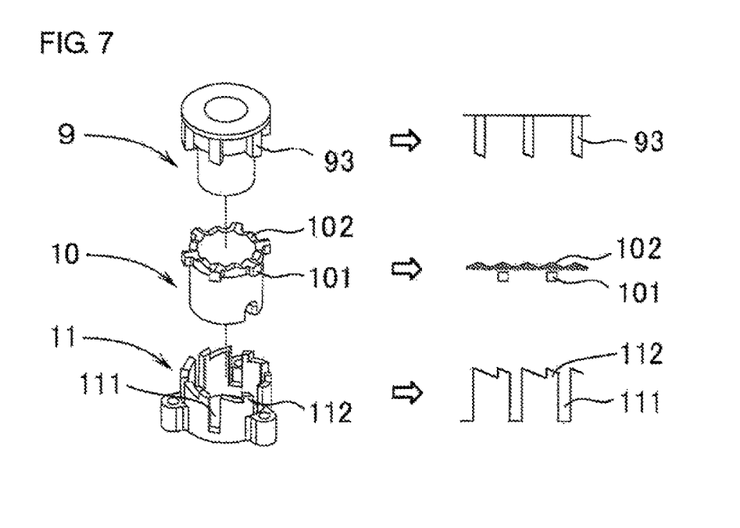
FIG. 7 is a schematic view schematically illustrating fitting portions of a rotary cam, protrusion portions and peak portions of a stationary cam, and recessed portions and tab portions of a slide cam.

In the following, the mechanism of fixation and release of the joint portion 4 is described in detail in conjunction with the drawings. FIG. 7 is a schematic view schematically illustrating the fitting portions 93 of the rotary cam member 9, the protrusion portions 101 and the peak portions 102 of the stationary cam member 10, the recessed portions 111 and the tab portions 112 of the slide cam member 11. FIGS. 8A to 8D and FIGS. 9A to 9D are schematic explanatory views using the schematic view of FIG. 7, illustrating the rotary cam member 9, the stationary cam member 10, and the slide cam member 11 of the joint fixation mechanism in an operation state. FIGS. 8A to 8D are schematic explanatory views of release of the joint portion 4. FIGS. 9A to 9D are schematic explanatory views of fixation of the joint portion 4.

(Release of the Joint Portion)

Figure 8A:
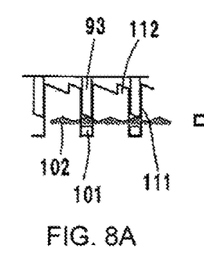
FIGS. 8A to 8D are schematic explanatory views illustrating a rotary cam, a stationary cam, and a slide cam of a joint fixation mechanism in an operation state.
Figure 8B:
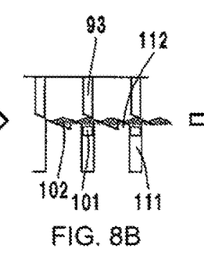
Figure 8C:
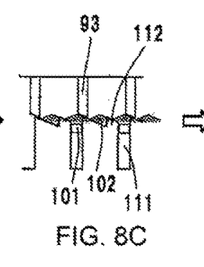

First, when the operation portion 74 of the sleeve 7 is pressed downward with the joint portion 4 in a fixed state as illustrated in FIGS. 3A and 8A, the slide cam member 11 fixed to the sleeve 7 is also moved downward. Furthermore, with the downward movement of the slide cam member 11, i.e., with the downward movement of the recessed portions 111, as illustrated in FIG. 8B, the fitting portions 93 of the rotary cam member 9 are disengaged from the recessed portions 111 and the upper ends of the recessed portions 111 are lowered to the positions of the peak portions 102 of the stationary cam member 10. Furthermore, when the operation portion 74 is further pressed downward, as illustrated in FIG. 8C, the fitting portions 93 are slightly moved to a right-hand trough portion along the slopes of the peak portions 102 of the stationary cam member 10.

Figure 8D:
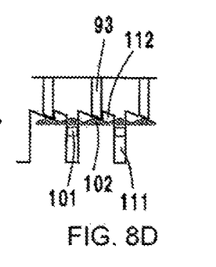

Next, when the operation portion 74 of the sleeve 7 is released in the above-described state, the slide cam member 11 is slightly moved upward by the coil spring 8. As illustrated in FIG. 8D, the fitting portions 93 of the rotary cam member 9 are moved to and caught by the tab portions 112 of the slide cam member 11. The fitting portions 93 are stopped in a fitting state.

Thus, the fitting portions 93 of the rotary cam member 9 are brought into a state where the fitting portions 93 are disengaged from the recessed portions 111 and are fitted to the tab portions 112 at the upper end of the slide cam member 11, i.e., the sleeve 7 is retained in a lowered state. As illustrated in FIG. 3B, the fitting between the tapered portion 51 or the joint locking tapered portion 511 of the joint fixation member 5 and the fitting tapered portion 72 of the sleeve 7 is released, so that the joint portion 4 is released.

Furthermore, with the joint portion 4 in a released state, as illustrated in FIG. 4, the joint portion 4 allows the joint fixation member 5 to be swingable within the range of the tapered angle of the tapered portion 51 or the inclination angle restricting tapered portion 512 formed on the joint fixation member 5.

(Fixation of the Joint Portion)

Figure 9A:
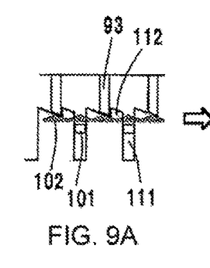
FIGS. 9A to 9D are schematic explanatory views illustrating a rotary cam, a stationary cam, and a slide cam of a joint fixation mechanism in an operation state.
Figure 9B:
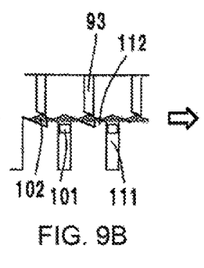
Figure 9C:
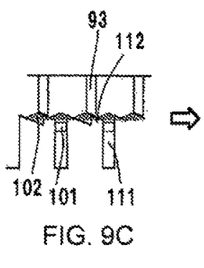

In order to bring the above-described joint portion 4 from a released state back into a fixed state, the operation portion 74 of the sleeve 7 is pressed downward in the released state illustrated in FIGS. 3B and 9A. Thus, as illustrated in FIG. 9B, the slide cam member 11 is also moved downward, the tab portions 112 of the slide cam member 11 are disengaged from the fitting portions 93 of the rotary cam member 9, and the upper ends of the recessed portions 111 are lowered to the positions of the peak portions 102 of the stationary cam member 10. Furthermore, when the operation portion 74 is further pressed downward, as illustrated in FIG. 9C, the fitting portions 93 are slightly moved to a right-hand trough portion along the slopes of the peak portions 102 of the stationary cam member 10.

Figure 9D:
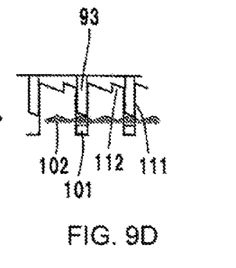

Next, when the operation portion 74 of the sleeve 7 is released in the above-described state, the slide cam member 11 is slightly moved upward by the coil spring 8, the fitting portions 93 of the rotary cam member 9 are moved to the positions of the recessed portions 111 along the slopes of the tab portions 112. As illustrated in FIG. 9D, the recessed portions 111 are supported by the protrusion portions 101 and the fitting portions 93, and the slide cam member 11 is moved upward.

Thus, the sleeve 7 is retained in an elevated state. As illustrated in FIG. 3A, the tapered portion 51 or the joint locking tapered portion 511 of the joint fixation member 5 is fitted to the fitting tapered portion 72 of the sleeve 7, and the joint portion 4 is fixed.

Thus, the joint fixation mechanism for a leg support member of the present embodiment enables fixation and release of the joint portion 4 through a single action, pressing down the operation portion 74 of the sleeve 7 with respect to an imaging equipment-grade tripod. Thus, the joint fixation mechanism for a leg support member enables support of an imaging equipment in a stable state when the joint portion 4 is fixed and allows free angle adjustment when the joint portion 4 is released.

Furthermore, as illustrated in FIG. 1, the joint fixation mechanism for a leg support member of the present embodiment may include an extendable mechanism for adjusting the length of the leg support member 3 at an intermediate part of the long leg support member 3, which is arranged between the joint portion 4 and the imaging equipment mounting portion 31. In this case, the leg support member 3, the length of which is adjusted by release of stops 32, is re-fixed by the stops 32. Thus, the height of the imaging equipment can be maintained at a desired height, enabling imaging in stable position.

Heretofore, an embodiment of the present invention has been described. However, the joint fixation mechanism for a leg support member of the present invention is not limited to the above-described embodiment, but various modifications and changes may be made without departing from the gist of the present invention.

In the above-described embodiment, the joint portion 4 including the joint fixation mechanism of the present invention is provided between the leg base portion 2 and the leg support member 3 of the simple imaging equipment-grade tripod 1 with relatively short legs as illustrated in FIG. 1. However, for example, the joint fixation mechanism may be provided between a leg base portion 2 and an imaging equipment mounting portion 31 of a general tripod with long legs.

The invention claimed is:

1. A joint fixation mechanism for a leg support member including a joint portion for angle adjustment arranged between a leg base portion and the leg support member of an imaging equipment-grade tripod, the joint portion comprising:
   a joint fixation member including a tapered portion on a lower inner side, the joint fixation member including a joint above the tapered portion;
   a pole member having a lower end connected to the leg base portion and an upper end connected by the joint of the joint fixation member;
   a sleeve provided below the joint fixation member, the sleeve having a space therein and an upper insertion hole at an upper central part through which the pole member is inserted, the sleeve having a fitting tapered portion around the upper insertion hole for fitting to the tapered portion of the joint fixation member, the sleeve being formed with an operation portion protruding outward from a side surface of the sleeve; and
   a coil spring for pressing the sleeve upward, the coil spring being wound around a central axis of the pole member in the space of the sleeve,
   wherein, with the joint portion being fixed by fitting between the tapered portion of the joint fixation member and the fitting tapered portion of the sleeve, the joint portion is released as the sleeve is pressed downward so that the tapered portion of the joint fixation member and the fitting tapered portion of the sleeve are moved away from each other.

2. The joint fixation mechanism for a leg support member according to claim 1, comprising:
   a rotary cam member accommodated in the space of the sleeve, the rotary cam member having a bottomed columnar shape, the rotary cam member having a bottom insertion hole at a central part of a bottom portion through which the pole member is inserted, the rotary cam member having a coil spring lower end receiving portion around the bottom insertion hole for receiving a lower end of the coil spring, the rotary cam member having a fitting portion protruding outward and extending axially on an upper side surface thereof;
   a stationary cam member having a columnar shape, the stationary cam member being accommodated in the space of the sleeve, the stationary cam member being fixed to the pole member and the leg base portion, the stationary cam member allowing the rotary cam member to be rotatably inserted, the stationary cam member having a protrusion portion protruding outward from an upper end thereof, the stationary cam member also having a peak portion for assisting rotation of the rotary cam member on the upper end thereof; and
   a slide cam member having a columnar shape, the slide cam member being accommodated in the space of the sleeve, the slide cam member being fixed to the sleeve, the slide cam member having a plurality of recessed portions on a side surface thereof, the recessed portions being supported to be slidable in an upward and downward direction by the fitting portion of the rotary cam member and the protrusion portion of the stationary cam member, the slide cam member having a tab portion for suppressing rotation of the rotary cam member on an upper peripheral portion of the slide cam member between the recessed portion and an adjacent recessed portion,
   wherein, with the joint portion being fixed by fitting between the tapered portion of the joint fixation member and the fitting tapered portion of the sleeve, when the sleeve is pressed downward, the fitting portion of the rotary cam member is disengaged from the recessed portion of the slide cam member, and the fitting portion of the rotary cam member is rotated along a slope of the peak portion of the stationary cam member, and then when the sleeve is released, the fitting portion of the rotary cam member is caught by the tab portion of the slide cam member and is fixed with the sleeve being in a lowered state, and contact between the tapered portion of the joint fixation member and the fitting tapered portion of the sleeve is released, so that the joint portion is released, and
   when the sleeve is again pressed downward, the fitting portion of the rotary cam member is disengaged from the tab portion of the slide cam member, and the fitting portion of the rotary cam member is rotated along the slope of the peak portion of the stationary cam member, and then when the sleeve is released, the recessed portion of the slide cam member is supported by the protrusion portion of the stationary cam member and the fitting portion of the rotary cam member, the slide cam member is moved upward and the sleeve is moved upward, the tapered portion of the joint fixation member is fitted to the fitting tapered portion of the sleeve, so that the joint portion is fixed.

3. The joint fixation mechanism for a leg support member according to claim 1, wherein, with the joint portion in a released state, the joint fixation member is swingable within a range of a tapered angle of the tapered portion formed on the joint fixation member.

4. The joint fixation mechanism for a leg support member according to claim 1,
   wherein, the tapered portion formed on the joint fixation member includes a joint locking tapered portion and an inclination angle restricting tapered portion,
   with the joint portion in a fixed state, the joint locking tapered portion is fitted and fixed to the fitting tapered portion of the sleeve, and
   with the joint portion in a released state, the joint fixation member is swingable within a range of a tapered angle of the inclination angle restricting tapered portion.

5. The joint fixation mechanism for a leg support member according to claim 1, wherein the joint for connecting the joint fixation member to the pole member is a universal joint connected by two perpendicularly intersecting pins or a ball joint including a socket portion formed on the joint fixation member and a spherical portion formed at an upper end of the pole member.

6. The joint fixation mechanism for a leg support member according to claim 1, wherein an extendable mechanism for adjusting a length of the leg support member is provided at an intermediate part of the leg support member.

* * * * *